(12) United States Patent
Badri et al.

(10) Patent No.: US 9,188,697 B2
(45) Date of Patent: Nov. 17, 2015

(54) TRACKING NON-UNIFORM FLOODING FRONTS OF GAS INJECTION IN OIL RESERVOIRS

(75) Inventors: Mohammed Badri, Al-Khobar (SA); Patrice Ligneul, Al-Khobar (SA); Khaled Hadj-Sassi, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 731 days.

(21) Appl. No.: 13/343,091

(22) Filed: Jan. 4, 2012

(65) Prior Publication Data

US 2013/0173166 A1 Jul. 4, 2013

(51) Int. Cl.
| | | |
|---|---|---|
| *G01N 15/08* | (2006.01) | |
| *G01V 7/06* | (2006.01) | |
| *E21B 47/00* | (2012.01) | |
| *E21B 43/00* | (2006.01) | |
| *E21B 43/16* | (2006.01) | |
| *G01V 7/00* | (2006.01) | |

(52) U.S. Cl.
CPC ............ *G01V 7/06* (2013.01); *E21B 43/164* (2013.01); *E21B 43/00* (2013.01); *E21B 43/16* (2013.01); *E21B 47/00* (2013.01); *G01V 7/00* (2013.01)

(58) Field of Classification Search
CPC ....... G06F 19/00; E21B 43/164; E21B 43/00; E21B 47/00; E21B 49/08; E21B 49/008; E21B 43/16; G01V 7/00
USPC .......................................................... 702/12
See application file for complete search history.

(56) References Cited

U.S. PATENT DOCUMENTS

| | | | |
|---|---|---|---|
| 4,813,274 A | * | 3/1989 | DiPersio et al. ............ 73/152.48 |
| 8,438,917 B2 | | 5/2013 | Goldberg |
| 8,527,205 B2 | | 9/2013 | Legendre et al. |
| 2009/0012741 A1 | * | 1/2009 | Hall et al. .................... 702/150 |
| 2009/0255670 A1 | * | 10/2009 | Koyama et al. ............ 166/252.1 |
| 2010/0161226 A1 | * | 6/2010 | Homan ............................ 702/8 |
| 2011/0042074 A1 | * | 2/2011 | Goldberg ................. 166/250.01 |
| 2011/0185806 A1 | | 8/2011 | Pfutzner |
| 2011/0191027 A1 | | 8/2011 | Pfutzner et al. |

OTHER PUBLICATIONS

De Wit, Viscous fingering of miscible slices, Aug. 2005, 1-10.*
Berenblyum, et al., "Modelling CO 2 Injection: IOR Potential after Waterflooding", SPE 113436—SPE/DOE Symposium on Improved Oil Recovery, Tulsa, Oklahoma, Apr. 20-23, 2008, 8 pages.
Brady, et al., "Gravity Methods: Useful Techniques for Reservoir Surveillance", SPE 26095—SPE Western Regional Meeting, Anchorage, Alaska, May 26-28, 1993, 14 pages.

(Continued)

*Primary Examiner* — John Breene
*Assistant Examiner* — Eyob Hagos
(74) *Attorney, Agent, or Firm* — Bridget Laffey; Jakub Michna; Daniel Matthews

(57) ABSTRACT

Downhole gravity measurements are used to monitor the volumetric sweep of $CO_2$ and estimate the fingering phenomenon if any. The gravity measurements have been found to be effective due to the high density contrast between $CO_2$ and brine or oil which provides better and higher sensitivity. An analytical forward model is used to determine the location and shape characteristics of the flooding front. A strategy to monitor the movement of the $CO_2$ flooding front and to predict the fingering phenomenon is used to provide a warning tool to improve the sweep efficiency, according to some embodiments.

18 Claims, 5 Drawing Sheets

(56) References Cited

OTHER PUBLICATIONS

Brady, et al., "Improved Production Log Interpretation in Horizontal Wells Using a Combination of Pulsed Neutron Logs, Quantitative Temperature Log Analysis, Time Lapse LWD Resistivity Logs and Borehole Gravity", SPE 46222 —SPE Western Regional Meeting, Bakersfield, California, May 10-13, 1998, 10 pages.

Brailovsky, et al., "Fingering Instability in Water-Oil Displacement", Transport in Porous Media, vol. 63 (3), Jun. 2006, pp. 363-380.

De Wit, et al., "Viscous fingering of miscible slices", Physics of Fluids, vol. 17 (5), 2005, 9 pages.

Gasperikova, et al., "Gravity monitoring of CO2 movement during sequestration: Model studies", Geophysics, vol. 73 (6), 2008, pp. WA105-WA112.

Hadj-Sassi, et al., "Three-Dimensional Inversion of Borehole Gravity Measurements for Reservoir Fluid Monitoring", SPE 136928—SPE/DGS Saudi Arabia Section Technical Symposium and Exhibition, Al-Khobar, Saudi Arabia, Apr. 4-7, 2010, 13 pages.

Schultz, Alton K., "Monitoring fluid movement with the borehole gravity meter", Geophysics, vol. 54 (10), Oct. 1989, pp. 1267-1273.

International Search Report and Written Opinion of PCT Application No. PCT/US2012/066966 dated Jan. 22, 2014: pp. 1-10.

\* cited by examiner

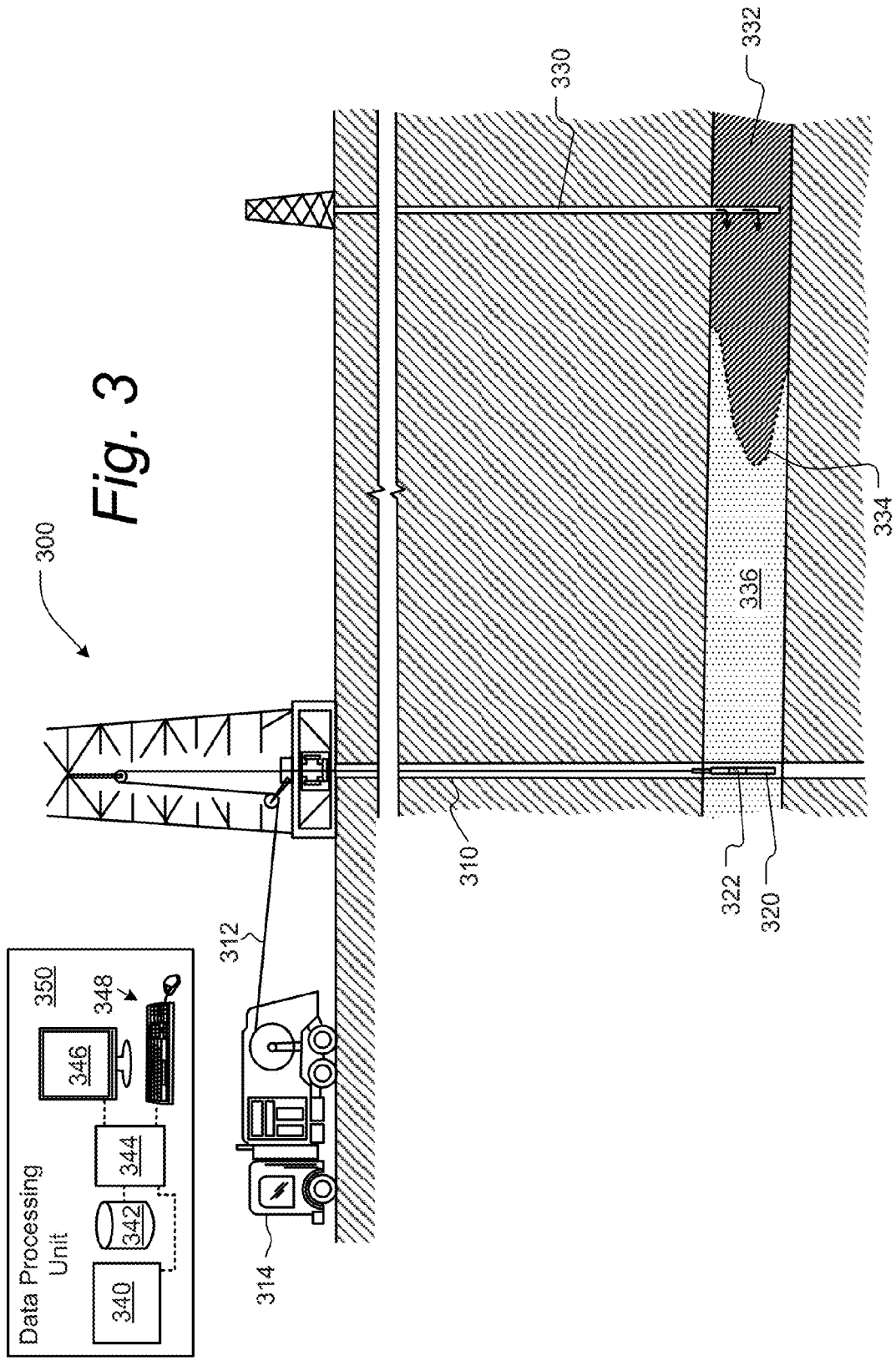

TRACKING NON-UNIFORM FLOODING FRONTS OF GAS INJECTION IN OIL RESERVOIRS

FIELD

The subject disclosure relates to the field of tracking flooding fronts of gas introduced into subterranean reservoirs. More specifically, the subject disclosure relates to techniques for tracking of non-uniform flooding fronts of gas injected in oil reservoirs.

BACKGROUND

The use of $CO_2$ or gas as agents for a better recovery of oil in reservoirs has been used for many years. One difficulty is the occurrence of "fingering" resulting from viscous instability between the flooding fluid and the flooded fluid. Fingering is a complex non-linear mechanism difficult to estimate in real conditions and particularly when local reservoir heterogeneities that cannot be captured trigger the phenomenon.

The fundamental theory of fingering instability occurrence is well explained by the "Buckley-Leverett" model. See I. Brailovski et al. ("Fingering Instability in Water-Oil Displacement," Transport in Porous Media (2006) Vol. 63. pp 363-380, hereinafter, "Brailovski"). The exact shape of fingering when occurring is very difficult to predict.

FIG. 1 is a series of 2D images 100 of fingering modeled in a Heleshaw tank, from De Wit, A., Bertho, Y. and Martin, M., "Viscous fingering of miscible slices," Physics of Fluids, 17, 054114 (2005). In the series 100, a darker color fluid 110 is being pushed through a lighter color fluid 112, showing "Saffman-Taylor" instabilities and resulting in extended "fingers" such as finger 120, which can be of very long extension. The shapes of fingers are highly variable but as a rule they are shown to be "slender," more or less 2 dimensional (contained in a high permeability layer) as can be seen in the modeled image of FIG. 1. FIG. 2 depicts results of numerical modeling of such instabilities from Brailovski. From the image 200, it can be seen that the instabilities can be of complicated shapes. The extension of the fingers is generally radial and each finger is rather slender.

Due to the difficulty in predicting the complex shapes of the flooding fronts of gas being injected into subterranean oil reservoirs, there is a need for techniques for monitoring such fronts.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with some embodiments a system is provided for monitoring an injected gas, such as $CO_2$ gas injected into the subterranean reservoir through one or more injector wellbores. The system includes a downhole gravity measurement tool adapted to be deployed in a borehole and to make gravity measurements at a downhole location; and a processing system adapted and programmed to receive data representing the gravity measurements from the downhole gravity measurement tool and based at least in part thereon to monitor parameters associated with gas introduced into a subterranean reservoir. According to some embodiments the monitored parameters can be: distance from the downhole location to a front associated with the injected $CO_2$ gas, inclination angle associated with the injected $CO_2$ gas and a reference plane, or location of an interface associated with the injected $CO_2$ gas. According to some embodiments, the monitoring can also include identification of shape characteristics of an interface associated with the $CO_2$ gas, such as elongated finger-like shapes. According to some embodiments the monitoring of parameters associated with the introduced gas is based on horizontal components of the gravity measurements.

According to some embodiments, a method is provided for monitoring gas, such as $CO_2$ gas, injected into a subterranean reservoir. The method includes deploying a downhole gravity measurement tool in a borehole at a downhole location within the subterranean reservoir; making gravity measurements at the downhole location and generating therefrom data representing the measurements; and monitoring parameters associated with gas introduced into the subterranean reservoir based on the data representing the measurements. According to some embodiments a downhole gravity measurement tool is also deployed in one or more other boreholes and the data is compared and selecting based on measured gravity magnitude. According to some embodiments a plan for injecting the $CO_2$ gas is modified based on the identification of shape characteristics such as fingering.

Further features and advantages will become more readily apparent from the following detailed description when taken in conjunction with the accompanying Drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein:

FIG. 3 illustrates a wellsite where gas is being injected and the flooding front is being tracked, according to some embodiments;

DETAILED DESCRIPTION

Figure 1:
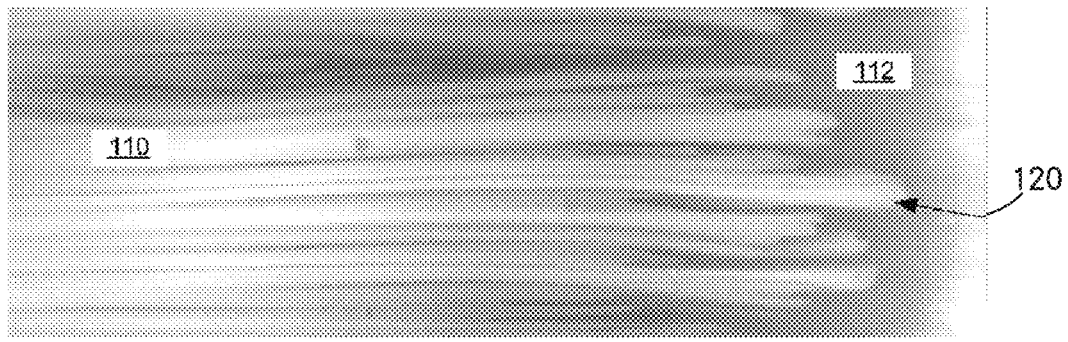
FIG. 1 is a series of 2D images of fingering modeled in a Heleshaw tank as shown in prior art.
Figure 2:
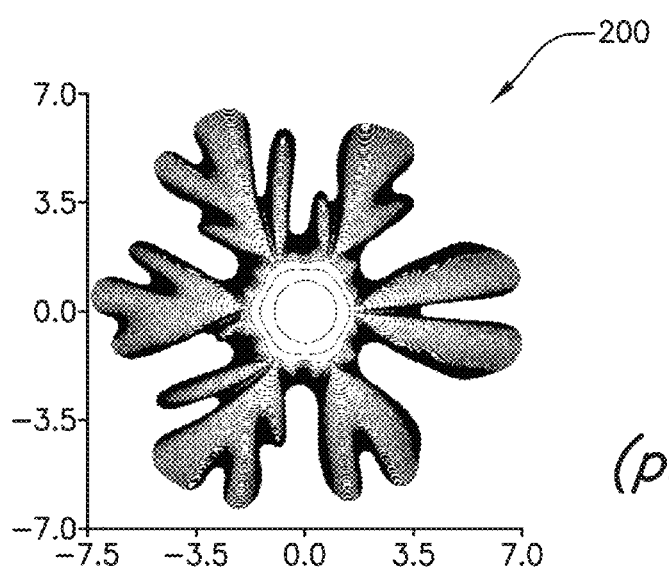
FIG. 2 depicts results of numerical modeling of instabilities as shown in prior art.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in each embodiment. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages or any combination thereof. When implemented in software, firmware, middleware or microcode, the program code or code segments to perform the required tasks may be stored in a machine readable medium. A processor(s) may perform the required tasks.

Due to the difficulty in predicting non-uniform flooding patterns in a reservoir, the detection of such patterns relies instead on sufficient information to image the fingering system. Critical $CO_2$ has a density around 468 kg/m$^3$, representing a good contrast for deep density measurements such as Gravimetry survey.

According to some embodiments, gravimetric tomography survey data in time lapses is used to characterize slender structures as fingering structures passing in the vicinity of observation wells. According to some embodiments, a characterization that the detected front flooding is not uniform but rather comprises slender structures is used as an input in the design and strategy used to carry out the injection and flooding.

According to some embodiments, gravity measurements are used to monitor the volumetric sweep of $CO_2$ and estimate the fingering phenomenon if any. The gravity measurements have been found to be effective due to the high density contrast between $CO_2$ and brine or oil which provides better and higher sensitivity for the gravity responses. See E. Gasperikova and G. M. Hoversten. Gravity monitoring of $CO_2$ movement during sequestration: Model studies. Geophysics Vol. 73. No. 6 (2008), which is incorporated by reference herein. According to some embodiments, an analytical forward model is developed and used. A strategy to monitor the movement of the $CO_2$ flooding front and to predict the fingering phenomenon is used to provide a warning tool to improve the sweep efficiency, according to some embodiments.

Figure 4A:
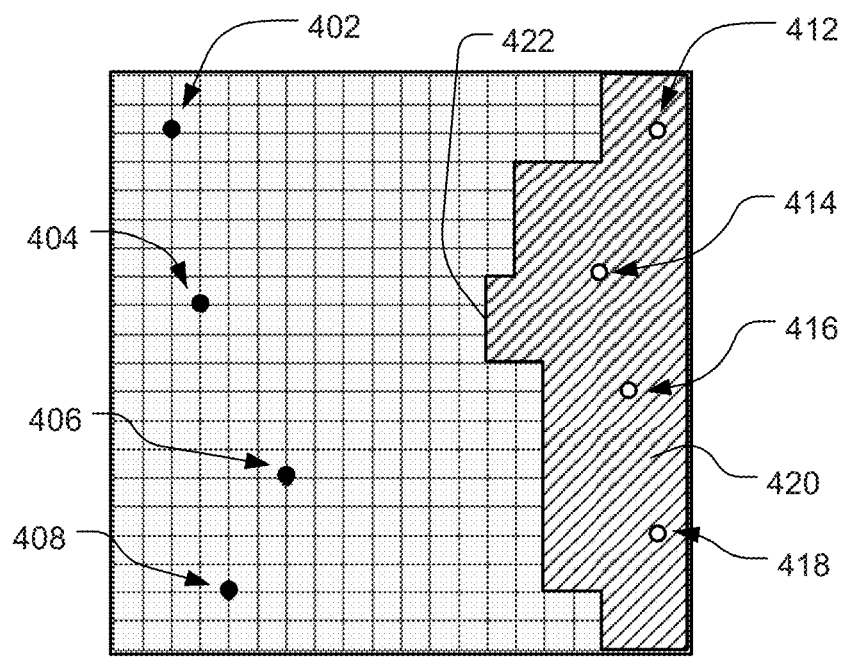
FIGS. 4A and 4B are top-view, or horizontal plane diagrams illustrating injected gas flooding from a number of injections wells towards a number of observation wells at two different times, according to some embodiments.
Figure 4B:
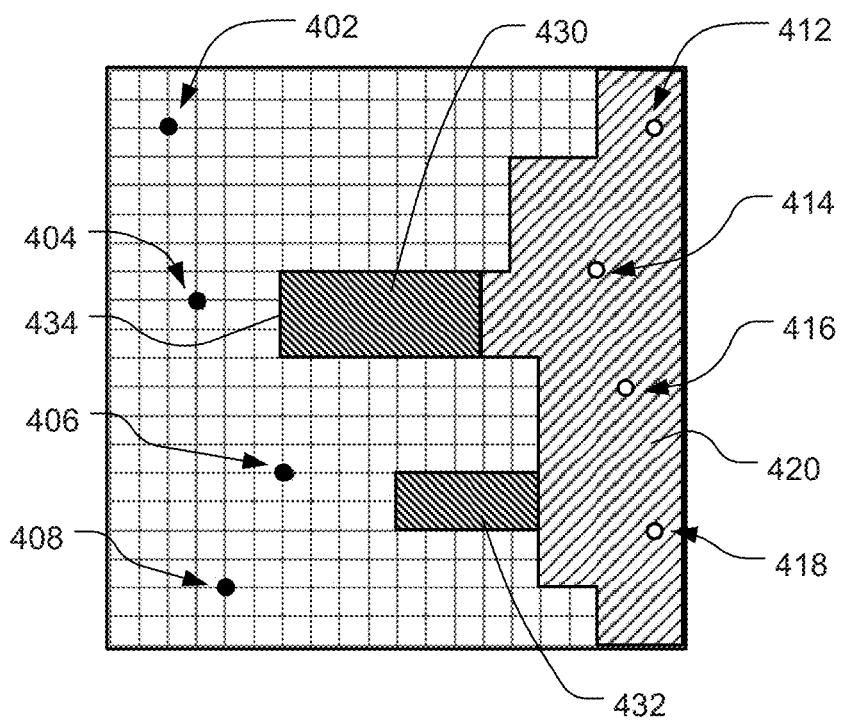

As a supercritical fluid, $CO_2$ exhibits different properties depending on pressure and temperature conditions. It has a high mobility ratio. Under miscible conditions, it has an affinity for oil and mixes to form a low viscosity. For the EOR process to be successful, the $CO_2$ should first be in contact with the oil, and then be directed to effectively sweep the reservoir. In heterogeneous oil reservoirs, the fingering phenomenon of $CO_2$ might be formed along high permeability zones as shown in FIGS. 1, 4A and 4B. See, e.g., R. Berenblyum, G. Calderon, L. Kollbotn, L. M. Surguchev. Modeling CO2 injection: IOR potential after waterflooding, SPE 113436 (2008). Such phenomenon reduces the sweep efficiency and causes poor flood performance.

To monitor the volumetric sweep of $CO_2$ flooding, to predict whether there is any fingering phenomenon and to provide early warning of any potential loss of containment, the gravity measurement is a reasonable candidate to be used in $CO_2$ monitoring application. $CO_2$ is less dense and more compressible than brine or oil—its density is around 0.46 g/cm$^3$. The density contrast between $CO_2$ and brine or oil is high, and consequently the gravity measurements have a good sensitivity to density change and will have a stronger signal. According to some embodiments, such data are acquired by the borehole gravity meter (BHGM), which runs on wireline cable for reservoir monitoring. The BHGM has been found to provide a large depth of investigation and good vertical resolution at typical reservoir depths. The BHGM could be used in many applications as has been described in several studies. See: J. L. Brady and D. S. Wolcott, Gravity Methods: Useful Techniques for Reservoir Surveillance. (May 1993). SPE 26095; J. L. Brady et al. Improved Production Log Interpretation in Horizontal Wells Using a Combination of Pulsed Neutron Logs, Quantitative Temperature Log Analysis, Time Lapse LWD Resistivity Logs and Borehole Gravity. (May 1998). SPE 46222; K. Hadj-Sassi and J.-M. Donadille, Three-dimensional inversion of borehole gravity measurements for reservoir fluid monitoring. SPE 136928. April 2010; and K. Schultz. Monitoring fluid movement with the borehole gravity meter. Geophysics, Vol. 54, No. 10 (October 1989), pp. 1267-1273, 8 Figures).

FIG. 3 illustrates a wellsite where gas is being injected and the flooding front is being tracked, according to some embodiments. Wellsite 300 includes multiple injection wells, of which injection well 330 is shown, as well as multiple observation/monitoring wells, of which observation/monitoring well 310 is shown. Gas is being injected via the injection well 330 and other injection wells into the reservoir formation 336. The reservoir 336, for example, can be a heterogeneous oil reservoir. The injected gas, according to embodiments, is $CO_2$ gas and has flooded region 332 which includes a non-uniform front 334. The front 334 is being monitored using gravity measurements using a borehole gravity meter 332 that is part of a wireline toolstring 320. The toolstring 320 is deployed in well 310 via wire 312 from logging truck 314. Further details of a suitable borehole gravity meters is provided in U.S. Patent Application Publication Nos. 2011/0185806, and 2011/0191027, both of which are hereby incorporated by reference.

A data processing unit 350 is included, which according to some embodiments, is located within logging truck 314 and according to other embodiments is partially or fully located at other locations at the wellsite or one or more remote locations. The data processing unit 350 receives the gravity measurements from the gravity meter 322 and calculates therefrom, for example using the forward modeling techniques described herein, tracking information for the flooding front 334. The data processing unit 350 includes one or more central processing units 340, storage system 344, communications and input/output modules 340, a user display 346 and a user input system 348.

FIGS. 4A and 4B are top-view, or horizontal plane diagrams illustrating injected gas flooding from a number of injections wells towards a number of observation wells at two different times, according to some embodiments. FIG. 4A shows the $CO_2$ flooded zone 420 having a flooding front 422. The $CO_2$ is being injected at injection wells 412, 414, 416 and 418. The observation wells (which can also be production wells) 402, 404, 406 and 408 are used to track the movement of the flooded zone. FIG. 4B shows the $CO_2$ flooding at time $T2=T1+\Delta t$. During the time $\Delta t$, the additional areas 430 and 432 have become flooded with the $CO_2$. The new flooding front 434 is shown on zone 430. Note that the flooding pattern shown in FIG. 4B has the appearance of viscous fingering.

The fingering phenomenon is understood to form following geological stratification mostly in the horizontal plane in the oil reservoir. In order to be sensitive to such phenomenon and then monitor its movement over time, the horizontal components of the gravity measurements—$g_x$ and $g_y$—are estimated for this application. Such components of the gravity data have better potential for tracking this phenomenon, compared to the vertical component of the gravity field $g_z$. The horizontal components provide better coverage of the information on the horizontal layers. Their sensitivities to the horizontal movement of the $CO_2$ flooding are important compared to that given by the vertical component of the gravity $g_z$. Hence, the horizontal components of the gravity measurements can be used to provide information on the fingering phenomenon of the $CO_2$ in an oil reservoir.

The horizontal components of the gravity field g are the gradients of the potential U in the x and y-directions, z being the vertical direction. Their expressions in the Cartesian coordinate system are described by the following equations:

$$g_x(r_s) = \nabla_x U(r_s) = G \int_V \rho(r) \frac{d}{dx} \frac{1}{|r-r_s|} dV \quad \text{Eq. 1}$$

$$g_y(r_s) = \nabla_y U(r_s) = G \int_V \rho(r) \frac{d}{dy} \frac{1}{|r-r_s|} dV \quad \text{Eq. 2}$$

U is the gravitational potential which respects the Laplace equation ($\nabla^2 U(r_s)=0$) outside of the source of the gravity field, G is the Newtonian gravitational constant, $G \approx 6.67 \times 10^{-11}$ N·m$^2$/kg$^2$, the lengths $r_s$ and r (in meters) respectively represent the observation location (measurement station) and the integration points and V is the body volume. U is expressed in m$^2$/s$^2$, g is in m/s$^2$ and $\rho$ is in kg/m$^3$.

Figure 5:
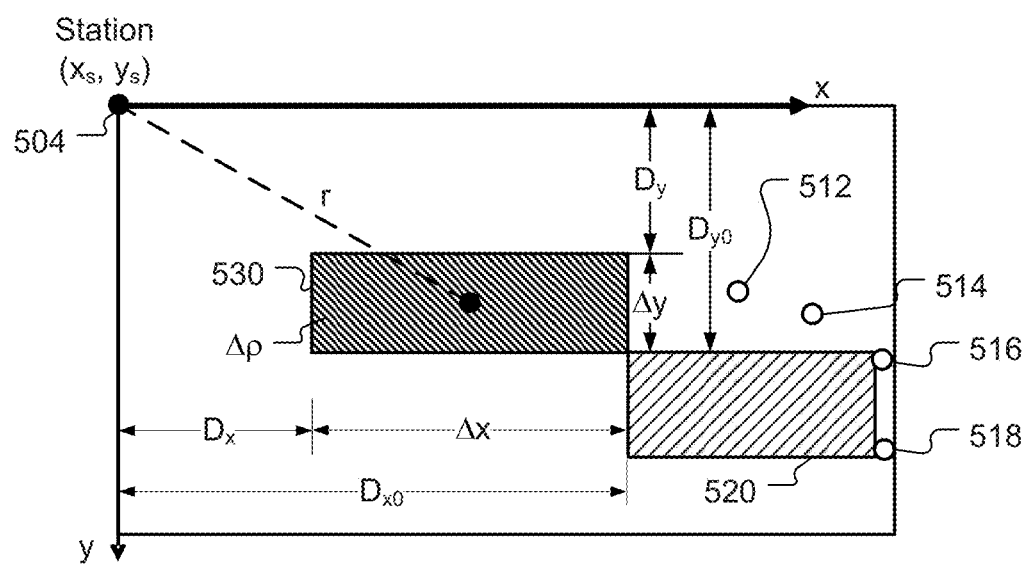
FIG. 5 is a top-down, horizontal view diagram showing the position of a $CO_2$ density anomaly at two different times, according to some embodiments.

FIG. 5 is a top-down, horizontal view diagram showing the position of a $CO_2$ density anomaly at two different times, according to some embodiments. Injection wells 512, 514, 516 and 518 are shown as is an observation well 504 at station position $x_s$ and $y_s$. The anomaly is shown at position 520 at time T1 and at position 530 at time T2 (where $T2=T1+\Delta t$). The viscous fingering of the $CO_2$ flooding of interest is described by the rectangular slab density anomaly as shown in FIG. 5. The $CO_2$ density anomaly is the distribution of the density contrast change over an interval of time [T1, $T2=T1+\Delta t$]. The $CO_2$ movement over the time lapse $\Delta t$, in the x and y directions, is represented by $\Delta x$ and $\Delta y$, respectively. The distances between the finger front and the x and y axis, intersecting the observation well placed at ($x_s$, $y_s$), are described by $D_x$ and $D_y$, respectively. $D_{x0}$ and $D_{y0}$ (shown in the FIG. 5) represent the initial position of the $CO_2$ fingering front ($CO_2$ flooding) at Time T1 ($D_{x0}=D_x+\Delta x$ and $D_{y0}=D_y+\Delta y$). The density contrast $\Delta \rho$ is assumed to be constant within the slab.

To compute the integrals of the equations 1 and 2, we first assume that the $CO_2$ to be injected infinitely along the z-direction of the reservoir (we neglect the vertical effect on the vertical distribution of the $CO_2$). Thus, Equation 1 and 2 are integrated along the z direction, varying from −infinity to +infinity, resulting in the Equations 3 and 4 that no longer depend on z. We then take the limits of x integral from $D_x$ to $D_{x0}$ and the limits of y from $D_y$ to $D_{y0}$. The horizontal attractions $g_x$ and $g_y$ due to the $CO_2$ density anomaly are then expressed as follows:

$$g_x(r_s) = 2G\Delta\rho \int_{D_x}^{D_{x0}} \int_{D_y}^{D_{y0}} \left[ \frac{(x-x_s)}{(x-x_s)^2+(y-y_s)^2} \right] dx\, dy \quad \text{Eq. 3}$$

$$g_y(r_s) = 2G\Delta\rho \int_{D_x}^{D_{x0}} \int_{D_y}^{D_{y0}} \left[ \frac{(y-y_s)}{(x-x_s)^2+(y-y_s)^2} \right] dx\, dy \quad \text{Eq. 4}$$

By integrating the term in brackets of the equation 3, with respect to x first then y, we get the x component of the gravity field $g_x$:

$$g_x(xs, ys; Dx, Dy) = \quad \text{Eq. 5}$$

$$2G \cdot \Delta\rho \begin{bmatrix} (D_{y0}-ys)\ln\left(\frac{\sqrt{(D_{x0}-xs)^2+(D_y-ys)^2}}{\sqrt{(D_x-xs)^2+(D_{y0}-ys)^2}}\right) \ldots - \\ (D_y-ys)\ln\left(\frac{\sqrt{(D_{x0}-xs)^2+(D_y-ys)^2}}{\sqrt{(D_x-xs)^2+(D_y-ys)^2}}\right) \ldots + \\ (D_{x0}-xs)\left(\begin{array}{c}\tan^{-1}\left(\frac{(D_{y0}-ys)}{(D_{x0}-xs)}\right) - \\ \tan^{-1}\left(\frac{(D_y-ys)}{(D_{x0}-xs)}\right)\end{array}\right) \ldots - \\ (D_x-xs)\left(\tan^{-1}\left(\frac{(D_{y0}-ys)}{(D_x-xs)}\right) - \tan^{-1}\left(\frac{(D_y-ys)}{(D_x-xs)}\right)\right) \end{bmatrix}$$

Similarly, the y component of the gravity field $g_y$ is given by:

$$g_y(xs, ys; Dx, Dy) = \quad \text{Eq. 6}$$

$$2G \cdot \Delta\rho \begin{bmatrix} (D_{x0}-xs)\ln\left(\frac{\sqrt{(D_{y0}-ys)^2+(D_{x0}-xs)^2}}{\sqrt{(D_y-ys)^2+(D_{x0}-xs)^2}}\right) \ldots - \\ (D_x-xs)\ln\left(\frac{\sqrt{(D_{y0}-ys)^2+(D_x-xs)^2}}{\sqrt{(D_y-ys)^2+(D_x-xs)^2}}\right) \ldots + \\ (D_{y0}-ys)\left(\begin{array}{c}\tan^{-1}\left(\frac{(D_{x0}-xs)}{(D_{y0}-ys)}\right) - \\ \tan^{-1}\left(\frac{(D_x-xs)}{(D_{y0}-ys)}\right)\end{array}\right) \ldots - \\ (D_y-ys)\left(\tan^{-1}\left(\frac{(D_{x0}-xs)}{(D_y-ys)}\right) - \tan^{-1}\left(\frac{(D_x-xs)}{(D_y-ys)}\right)\right) \end{bmatrix}$$

As we can see, the horizontal gravity measurements depend on $D_x$ and $D_y$ which represent the distances that separate the fingering front of $CO_2$ to the x-z and y-z planes that intersect the observation/monitoring well. The initial distances $D_{x0}$ and $D_{y0}$ are assumed to be known, as we may have information on the initial position of the $CO_2$ flooding at time T1. Therefore, by using the forward modeling systems described by the Equations 5 and 6, the horizontal gravity measurements $g_x$ and $g_y$ will directly provide: (1) the distances $D_x$ and $D_y$ from the observation well to the fingering front of $CO_2$ flooding; (2) the radial distance R from the observation/monitoring well to the $CO_2$ finger front: $R=(D_x^2+D_y^2)$ and (3) the angle (inclination) between the x-z plane and the fingering front of the $CO_2$ flooding: $\alpha=\tan^{-1}(Dy/Dx)$.

These parameters will provide an accurate estimation on the movement and the behavior of the fingering of $CO_2$ flooding that can be formed in the heterogeneous oil reservoir. Hence, we have an efficient method to track the $CO_2$ movement, which provides information to improve the problem of poor sweep efficiency of $CO_2$ in oil reservoirs.

Figure 6:
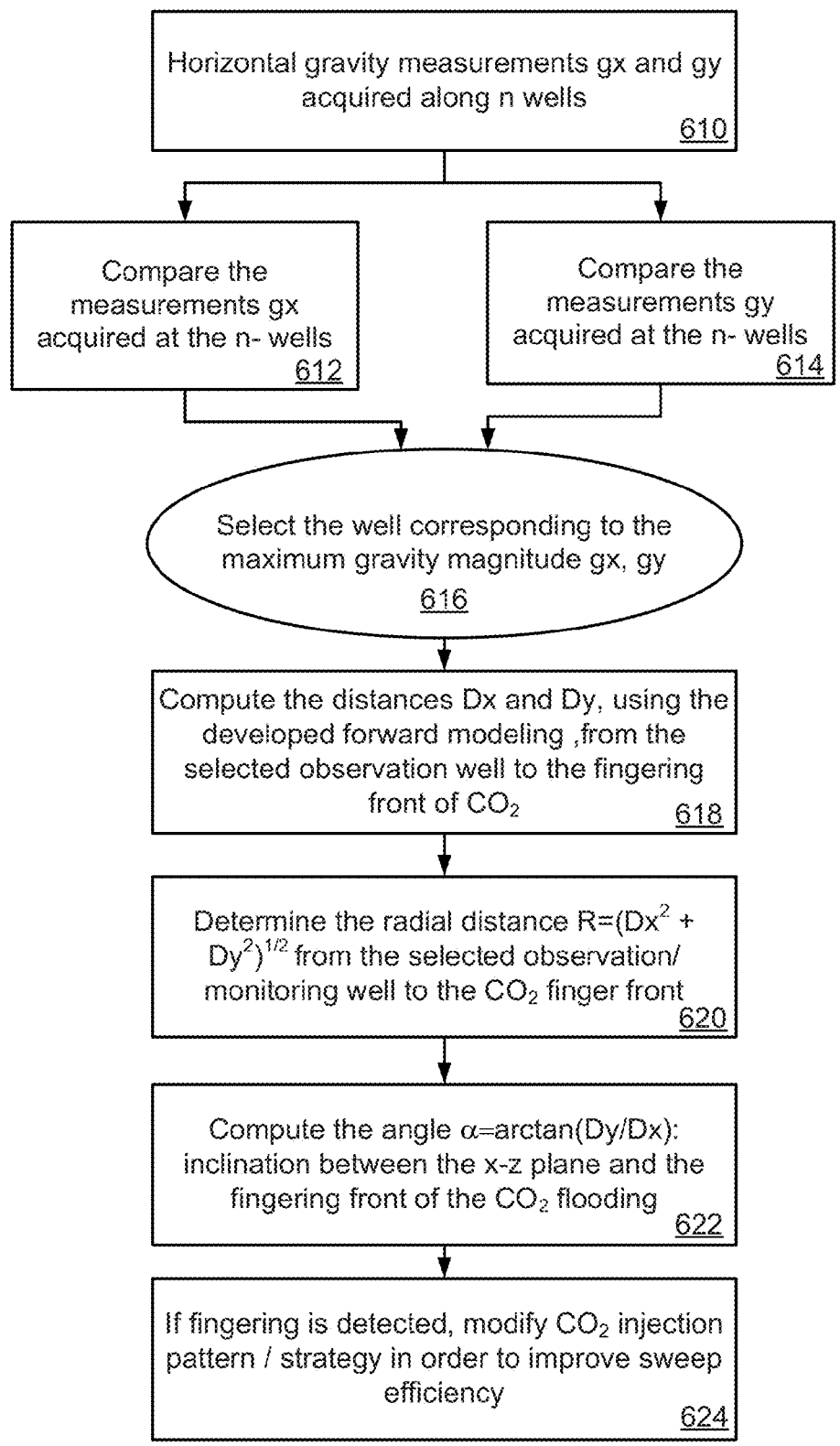
FIG. 6 is a flow chart showing processes for tracking a non-uniform injected gas flooding front, according to some embodiments.

FIG. 6 is a flow chart showing processes for tracking a non-uniform injected gas flooding front, according to some embodiments. In process 610, the gravity measurements $g_x$ and $g_y$ are acquired at one or multi wells surrounding the $CO_2$ movement. This may be done using a borehole gravity meter. In process 612 the measurements $g_x$ acquired at the multi wells are compared. In process 614 the measurements $g_y$ acquired at the multi wells are compared. In process 616 the maximum magnitude of the gravity response $g_x$ ($\max(g_x)$) is compared with that of $g_y$ ($\max(g_y)$) and the well position corresponding to the maximum magnitude of the horizontal gravity responses $\max(g_x, g_y)$ is selected. In the case $\max(g_x) \gg \max(g_y)$, the fingering phenomenon forms along the x-direction. Likewise, in the case $\max(g_x) \ll \max(g_y)$, the fingering phenomenon occurs along the y-direction.

In process 618, once the well is selected, the distances Dx and Dy are computed from that selected observation well to the fingering front of $CO_2$ flooding, using the developed forward modeling described by Equations 5 and 6. In process 620, the radial distance R is determined from the selected observation/monitoring well to the $CO_2$ finger front: $R=(Dx^2+Dy^2)$. In process 622 the angle (inclination) between the x-z plane and the fingering front of the $CO_2$ flooding: $\alpha=\arctan(Dy/Dx)$ is determined.

Finally, according to some embodiments, in process 624, in cases where there is any appearance of the fingering phenomenon, the $CO_2$ injection pattern/strategy is modified in order to improve the sweep efficiency.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wood parts together, whereas a screw employs a helical surface, in the environment of fastening wood parts, a nail and screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A system for monitoring gas introduced into a subterranean reservoir comprising:
    a downhole gravity measurement tool adapted to be deployed in a borehole and to make gravity measurements at a downhole location;
    a processing system adapted and programmed to receive data representing the gravity measurements including horizontal gravity measurements from the downhole gravity measurement tool and based at least in part thereon to monitor parameters associated with gas introduced into a subterranean reservoir; and
    wherein the monitored parameters includes an inclination angle associated with the introduced gas and a reference plane and wherein the inclination angle associated with the introduced gas is estimated based in part on the horizontal gravity measurements.

2. A system according to claim 1 wherein the introduced gas is $CO_2$ gas injected into the subterranean reservoir through one or more injector wellbores.

3. A system according to claim 2 wherein the monitored parameters includes distance from the downhole location to a front associated with the injected $CO_2$ gas.

4. A system according to claim 3 wherein the distance is estimated based in part on a forward modeling technique.

5. A system according to claim 2 wherein the monitored parameters includes a location of an interface associated with the injected $CO_2$ gas.

6. A system according to claim 2 wherein the monitored parameters includes an identification of shape characteristics of an interface associated with the $CO_2$ gas.

7. A system according to claim 6 wherein the shape characteristics include the presence of elongated finger-like shapes.

8. A system according to claim 1 wherein the monitoring is based in part on second gravity measurements made at a second downhole location.

9. A system according to claim 8 wherein the second downhole location is in a second borehole.

10. A system according to claim 1 wherein the monitoring is based in part on second gravity measurements made at the downhole location at a later time.

11. A system according to claim 1 wherein the data representing the gravity measurements represents gravity measurements within a horizontal plane.

12. A computer implemented method for monitoring gas injected into a subterranean reservoir comprising:
    deploying a downhole gravity measurement tool in a borehole at a downhole location within the subterranean reservoir;
    using the downhole gravity measuring tool to make gravity measurements including horizontal gravity measurements at the downhole location and generating therefrom data representing the measurements;
    using a processing system to monitor parameters associated with gas introduced into the subterranean reservoir based at least in part on the data representing the measurements; and
    wherein the parameters include an inclination angle associated with the injected gas and a reference plane and wherein the inclination angle associated with the injected gas is estimated based in part on the horizontal gravity measurements.

13. A method according to claim 12 wherein the introduced gas is $CO_2$ gas injected into the subterranean reservoir through one or more injector wellbores.

14. A method according to claim 12 further comprising:
    deploying a downhole gravity measurement tool in a second borehole within the subterranean reservoir; and
    making second gravity measurements at a downhole location in the second borehole and generating therefrom second data, wherein the monitoring includes comparing the data and the second data and selecting either the data or the second data for further use in monitoring based at least in part on measured gravity magnitude.

15. A method according to claim 13 wherein the monitored parameters includes distance from the downhole location to a front associated with the injected $CO_2$ gas, and the distance is estimated based in part on a forward modeling technique.

16. A method according to claim 13 wherein the monitored parameters includes an identifying shape characteristics of an interface associated with the $CO_2$ gas.

17. A method according to claim 16 wherein the shape characteristics include the presence of elongated finger-like shapes.

18. A method according to claim 16 further comprising altering a plan for injecting $CO_2$ gas based at least in part on the identifying of shape characteristics.

* * * * *